(12) United States Patent
Maldonado

(10) Patent No.: US 8,810,191 B2
(45) Date of Patent: Aug. 19, 2014

(54) SOLAR SIGN ILLUMINATION SYSTEM

(76) Inventor: David Maldonado, Chula Vista, CA (US)

(*) Notice: Subject to any disclaimer, the term of this patent is extended or adjusted under 35 U.S.C. 154(b) by 704 days.

(21) Appl. No.: 12/875,941

(22) Filed: Sep. 3, 2010

(65) Prior Publication Data

US 2010/0328933 A1   Dec. 30, 2010

Related U.S. Application Data

(63) Continuation-in-part of application No. 11/745,606, filed on May 8, 2007, now abandoned.

(51) Int. Cl.

| H01M 10/44 | (2006.01) |
|---|---|
| H01M 10/46 | (2006.01) |
| F21S 9/03 | (2006.01) |
| H05B 37/02 | (2006.01) |
| H05B 37/00 | (2006.01) |
| F21S 9/04 | (2006.01) |
| G09F 15/00 | (2006.01) |
| F21V 21/088 | (2006.01) |
| F21V 23/04 | (2006.01) |
| G09F 13/02 | (2006.01) |
| H02J 7/35 | (2006.01) |
| G09F 13/22 | (2006.01) |
| F21Y 101/02 | (2006.01) |

(52) U.S. Cl.
CPC ............. *F21S 9/035* (2013.01); *H05B 37/0281* (2013.01); *H05B 37/00* (2013.01); *H02J 7/35* (2013.01); *H05B 37/0227* (2013.01); *Y02B 20/46* (2013.01); *G09F 2013/222* (2013.01); *H05B 37/0218* (2013.01); *F21S 9/04* (2013.01); *F21Y 2101/02* (2013.01); *G09F 15/0037* (2013.01); *F21V 21/088* (2013.01); *F21V 23/0442* (2013.01); *G09F 13/02* (2013.01); *Y02B 20/42* (2013.01)
USPC ........................................................ 320/101

(58) Field of Classification Search
USPC .......... 320/101, 114, 115; 136/243, 244, 291, 136/293; 362/183, 191; 315/86
See application file for complete search history.

(56) References Cited

U.S. PATENT DOCUMENTS

| 4,441,143 | A | * | 4/1984 | Richardson, Jr. .............. 362/183 |
|---|---|---|---|---|
| 5,101,329 | A | | 3/1992 | Doyle |
| 5,149,188 | A | | 9/1992 | Robbins |
| 5,217,296 | A | | 6/1993 | Tanner |
| 5,539,627 | A | | 7/1996 | Foster |
| 5,564,816 | A | | 10/1996 | Arcadia et al. |
| 5,760,558 | A | * | 6/1998 | Popat ............................ 318/480 |
| 5,924,784 | A | | 7/1999 | Chliwnyj et al. |
| 6,004,002 | A | | 12/1999 | Giannone |
| 6,013,985 | A | | 1/2000 | Green |
| 6,028,694 | A | | 2/2000 | Schmidt |
| RE38,036 | E | | 3/2003 | Neumann |
| 6,573,659 | B2 | | 6/2003 | Toma |
| 6,788,000 | B2 | | 9/2004 | Appleberg et al. |
| 6,808,287 | B2 | * | 10/2004 | Lebens et al. ................. 362/184 |

(Continued)

*Primary Examiner* — Edward Tso
(74) *Attorney, Agent, or Firm* — Mark Wisnosky

(57) ABSTRACT

A lighting system hardware and control are described. Advantages of the system include the ability to add lighting to an otherwise unmodified location by providing a clamping system that is adaptable to multiple configurations and remote operability. Remote operability includes the ability to use renewable power sources such as solar or wind power and the ability for self-calibration with respect to the time of day. The system also minimizes the number of circuit components required thus making it optimally inexpensive and reliable.

11 Claims, 22 Drawing Sheets

(56) References Cited

U.S. PATENT DOCUMENTS 6,951,408 B2 * 10/2005 Stewart .................... 362/183
2006/0164827 A1 7/2006 Minewiser
2007/0209254 A1 9/2007 Perlo
2007/0236924 A1 10/2007 Personius et al.

* cited by examiner

SOLAR SIGN ILLUMINATION SYSTEM

CROSS-REFERENCE TO RELATED APPLICATIONS

This application is a continuation-in-part of application Ser. No. 11/745,606 filed 8 May 2007 now abandoned.

TECHNICAL FIELD

Embodiments of the invention relate to lighting systems that may be replaceably attached to signs and posts. The system is especially useful for real estate signs.

BACKGROUND OF THE INVENTION

The traditional means for advertising that a house is for sale or lease is by the placement of real estate signs at the front of the property. It is desirable that the signs are visible during high traffic times, which are often after sunset and before sunrise. The placement of the signs often precludes connection to conventional power sources such as outlets. A solar powered lighting system is a solution that has been suggested but still requires improvements for widespread acceptance. It is also desirable that the illumination can be turned off at specific hours. The ability to control the time that the illumination is on preserves battery life, is a courtesy to neighbors and may be required by local ordinance. Often the placement of the sign is not ideal for collection of solar energy. The ability to aim the solar photovoltaic collection panels independently of the light placement is an improvement. Non-ideal solar collection can also be mitigated by an improved power control system.

Doyle (U.S. Pat. No. 5,101,329) describes a lighting system for a real estate sign that clamps over the horizontal arm of the sign. Doyle provides no provisions for independently aiming the solar panels and no details for controlling the charging and discharging process. Tanner (U.S. Pat. No. 5,217,296) provides a lighting system to be attached to a flat wall and provides a means to independently aim the solar panels. However the control circuitry of Tanner is complicated and expensive. It requires separate circuitry for light sensing and battery and lamp control. Tanner does not provide means to control the lighting both before sunrise and after sunset. Tanner also does not provide for means to control the current or energy supplied to the lamps to prolong battery life. The mounting mechanism of Tanner would also not enable lockable attachment to a post. Giannone (U.S. Pat. No. 6,004,002) describes a complete real estate sign system including lighting. Although Giannone provides a solar panel that can be independently aimed, the system is not easily adapted to current signs without modification.

Typically the signs that are to be lighted are not located convenient to an electrical supply. Real Estate signs for example are often located at the front curb of the property far from convenient electrical outlets. There have been many systems advocating a battery powered system in which the batteries are recharged using electrical power from an associated photovoltaic solar panel. The challenge to implement such systems lies in designing a control system that will turn the lights on and off at the appropriate times, re-charge the batteries when solar energy is available, protect against overcharging the batteries to maintain battery life, protect against overheating batteries during the charging and discharging cycles, maximize utilization of the batteries available energy and prevent excessive discharge of the batteries such that the system is completely shutdown and control is lost and do all this with a minimum of electrical components to reduce cost. Schmidt (U.S. Pat. No. 6,028,694) describes an electronic control for LED's using a microcontroller and pulsed modulation for a power supply. However they do not describe an economical system. They include for example a switch mode power supply for current control. This task can more economically be accomplished with clever programming of the microcomputer.

There is a need for a portable solar lighting system that may be attached and securely locked to existing sign and post configurations without modification of the sign or post. There is a need to be able to lock the lighting system to the post using conventional padlocks to prevent theft. There is a need for a simplified control system for such lighting that will turn the lights on and off both after sunset and before sunrise, control the charge and discharge of the batteries in use and adjust the energy supplied to the lights to optimize battery life and illumination time. There is a need for a lighting system that can be flexibly aimed to light various portions of a sign attached to a post. A system is needed with the ability to aim the lighting to illuminate a top portion or attachment to a sign, a bottom portion or attachment to a sign and/or both. There is a need for a control system for a lighting system that will automatically determine the time of sunrise and sunset and program the duration of lighting of the sign relative to both sunset and sunrise.

SUMMARY OF THE INVENTION

A lighting system for outdoor signage that fills the deficiencies of the current art is described. The system provides automatic control of the time when the lights are illuminated. These times can be set for durations both post sunset and pre sunrise. The same electronics that controls the turning on and off of the lights also provides for a control of the energy supplied to the lights as a function of the state of the battery charge and control the flow of energy from integrated photovoltaic solar panels to the batteries. The electronics prevent both overcharge and excessive discharge of the batteries.

To insure a clear and complete description to enable a person of ordinary skill in the art to practice the invention, specific examples of applying the invention to a real estate and other commercial signs are provided. The associated hardware mechanism may be attached and locked to sign supports without the use of tools. It should be understood that the invention could apply to various modifications in other signage and non-signage illumination systems. The specific examples are not intended to limit the inventive concept to the example application. Other aspects and advantages of the invention will be apparent from the accompanying drawings and detailed description.

DETAILED DESCRIPTION

The invention comprises three basic parts, a physical lighting fixture, electronic circuitry, and algorithms used in conjunction with the control circuitry. A physical lighting fixture that may be removably attached to a post or sign where lighting is required is described. The description shows embodiments for application to a real estate sign located remote from a source of power. Applicability to other lighting situations will become apparent through this detailed description. New circuitry to control the lighting is also described. The circuitry uses an economy of components yet still provides considerable flexibility in timing, charge, and current control. The algorithms used to control the circuitry through the included microprocessor are also part of the described invention.

Lighting Fixtures

Figure 1:
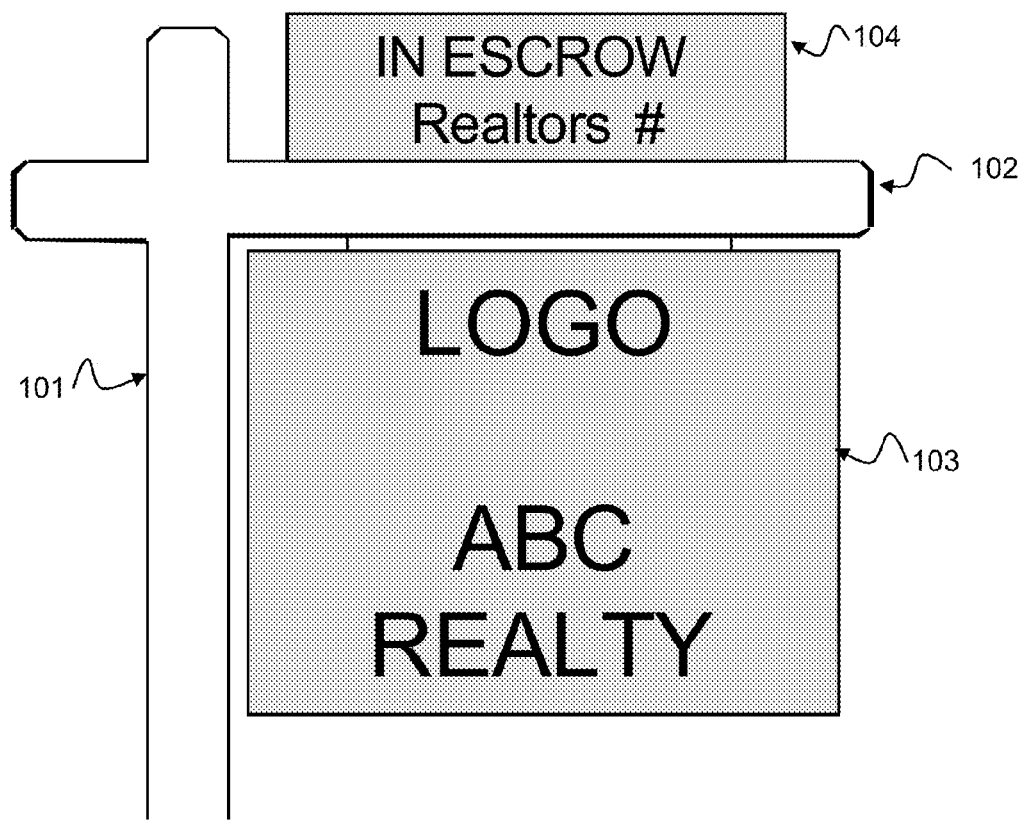
FIG. 1 is a view of a typical sign prior to attachment of the invention.

FIG. 1 shows a typical situation where the invention may be installed. A real estate sign consists of both a main sign portion 103 and a top sign portion 104 both of which would require periodic lighting. These signs are supported on a post structure comprised of a vertical upright post 101 and a cross beam 102. The invention may be attached and removed from this and similar structure without physical modification of the original sign structure.

Figure 2:
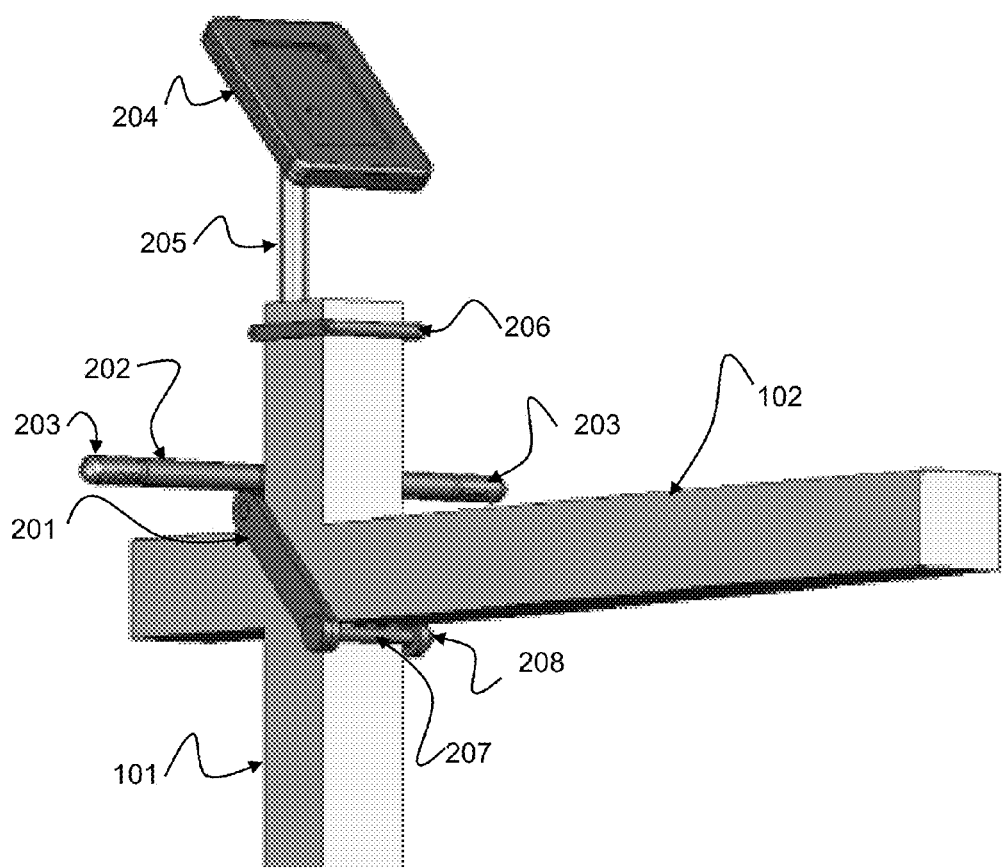
FIG. 2 represents one embodiment of the invention.
Figure 3:
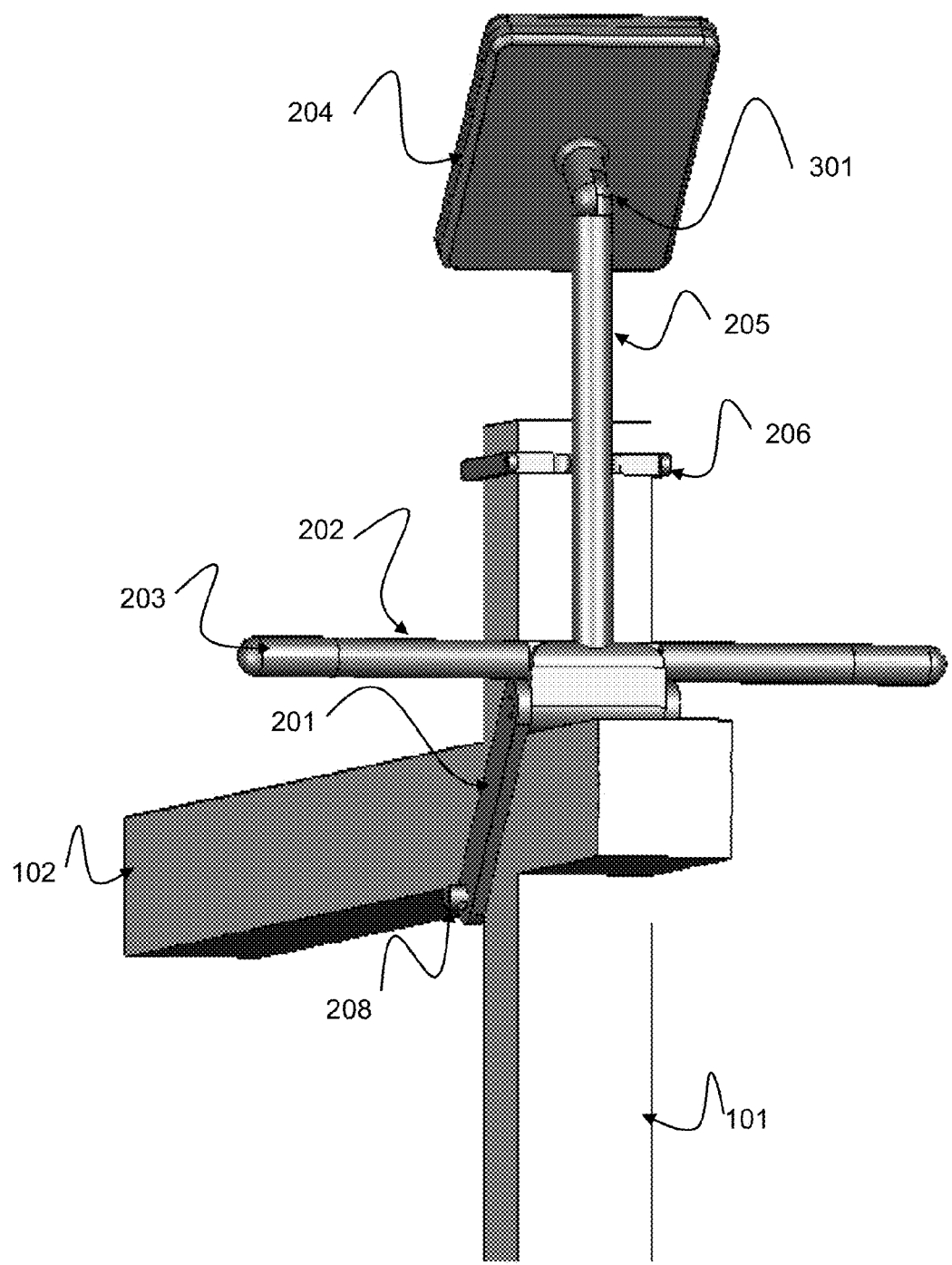
FIG. 3 is a second view of the embodiment presented in FIG. 2.
Figure 4:
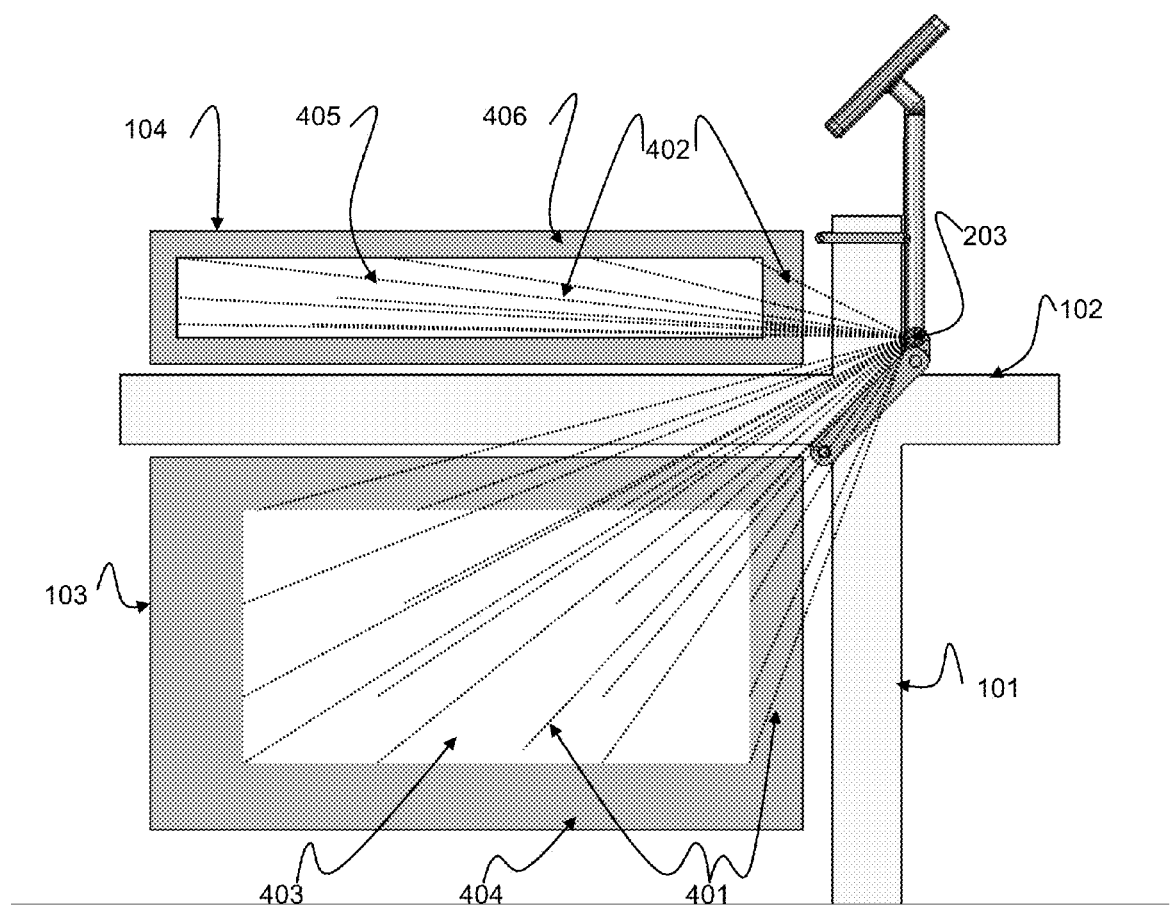
FIG. 4 presents an embodiment of the invention showing the lighting focus.

FIG. 2 shows one embodiment of the invention attached to a signpost of FIG. 1. A frame structure 201, 206, 207 and 208 is removably attached to the existing post. The Structure may be locked to the post for security purpose using a typical padlock attached through the hole 208 in the pin 207 attachment part. A light support means 202 is attached to the frame and serves to support and aim the lights 203 at the appropriate area of the sign. Another support means 205 supports a photovoltaic solar panel 204 in a position above the post and signage to avoid shadows. The frame structure 201, 206, 207, 208 and the light supports 202 and the solar panel 204 all fold flat for easy transport when the device is not attached to a post. FIG. 3, another view of the same embodiment, shows the attachment means 301 for the solar panel that enables both azimuth and elevation adjustment of the solar panel 204 to optimize solar collection for local physical location and geographical location. FIG. 4 depicts the focused lighting capability of an embodiment of the invention. The light sources 203 provide beams of light 401, 402 that can be aimed and focused on both the upper 104 and lower 103 signage sections. Areas of the sign may be highlighted by lighting an area of the sign 403, 405 that stand out by contrast from unlighted sections 404, 406 of the sign.

In another embodiment the entire sign is fully lit and the unlit areas 406 and 404 are eliminated.

Figure 5A:
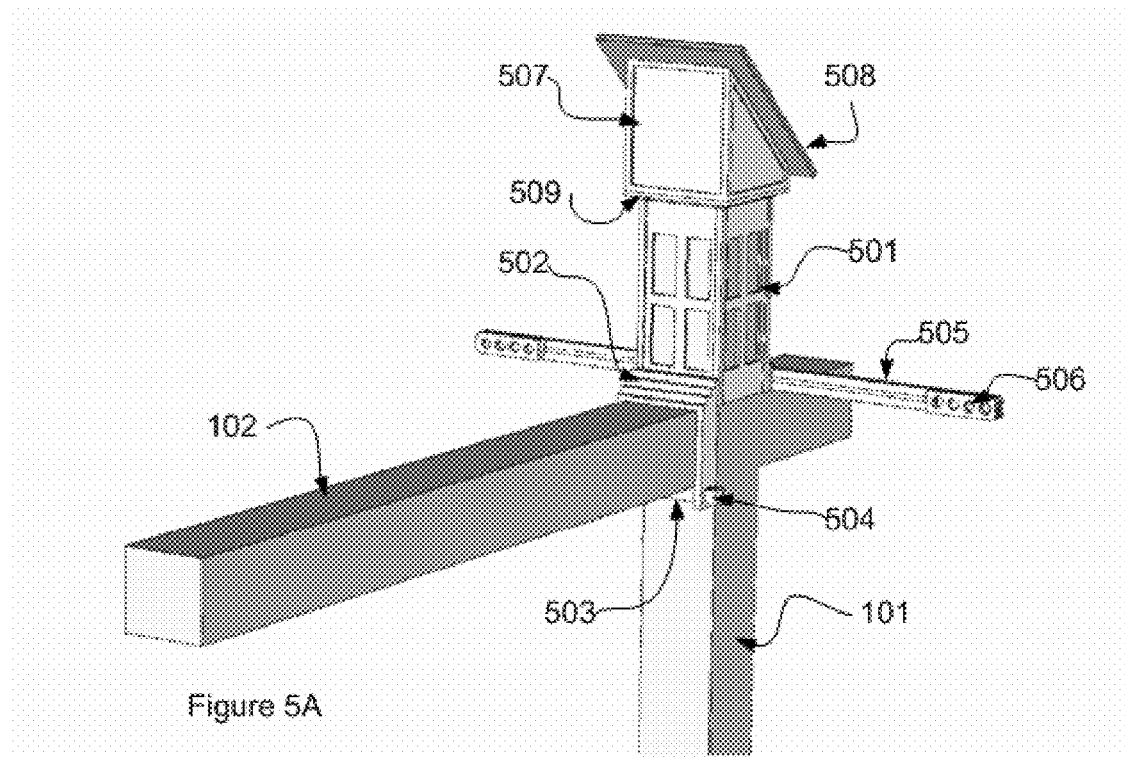
FIG. 5 represents a second and third embodiment of the invention.
Figure 5B:
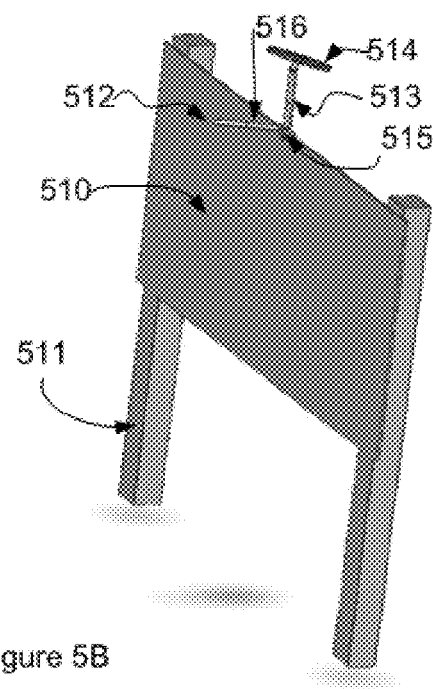

FIG. 5 depicts two additional embodiments of the invention. In FIG. 5a, a housing 501 fits over the top of the vertical post segment 101. The housing is clamped to the horizontal arm of the sign support through a clamping bracket 502 that is further comprised of a through pin 503 and a means 504 for attachment of a lock for security of the attachment. Lights 506 are attached to a light support arm 505. Photovoltaic solar panels 508 are attached to the top portion of the fixture through a combination housing and support 507. In the embodiment shown the elevation targeting of the solar panels is fixed by the angle of attachment to the housing and support 507. The angle and therefore the elevation may be designed for the particular latitude of the site where the system is used. Azimuth adjustment is provided by a rotatable mount 509 between the support 507 and the bottom housing 501. Batteries and electronics may be secured within the housing 507. In another embodiment the invention is applied to another sign that consists of support legs 511 and a one or two sided display panel 510. The lighting system is attached to the sign through a bolt system 515 that secures the fixture to the top of the sign. The light source 512 is embedded in a support arm 516. The solar panel 514 is attached to the top of a vertical support bar 513. Electronics are contained within any of the support arms 516 and 513 and within the solar panel housing.

Electronic Circuitry

Figure 6:
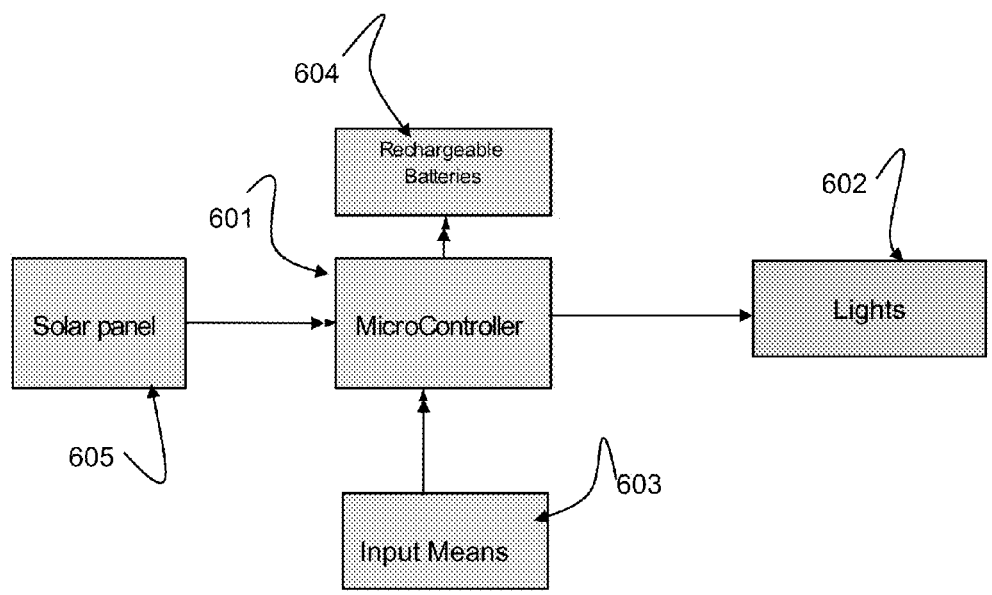
FIG. 6 is a block diagram of the electronic circuitry of an embodiment of the invention.
Figure 7:
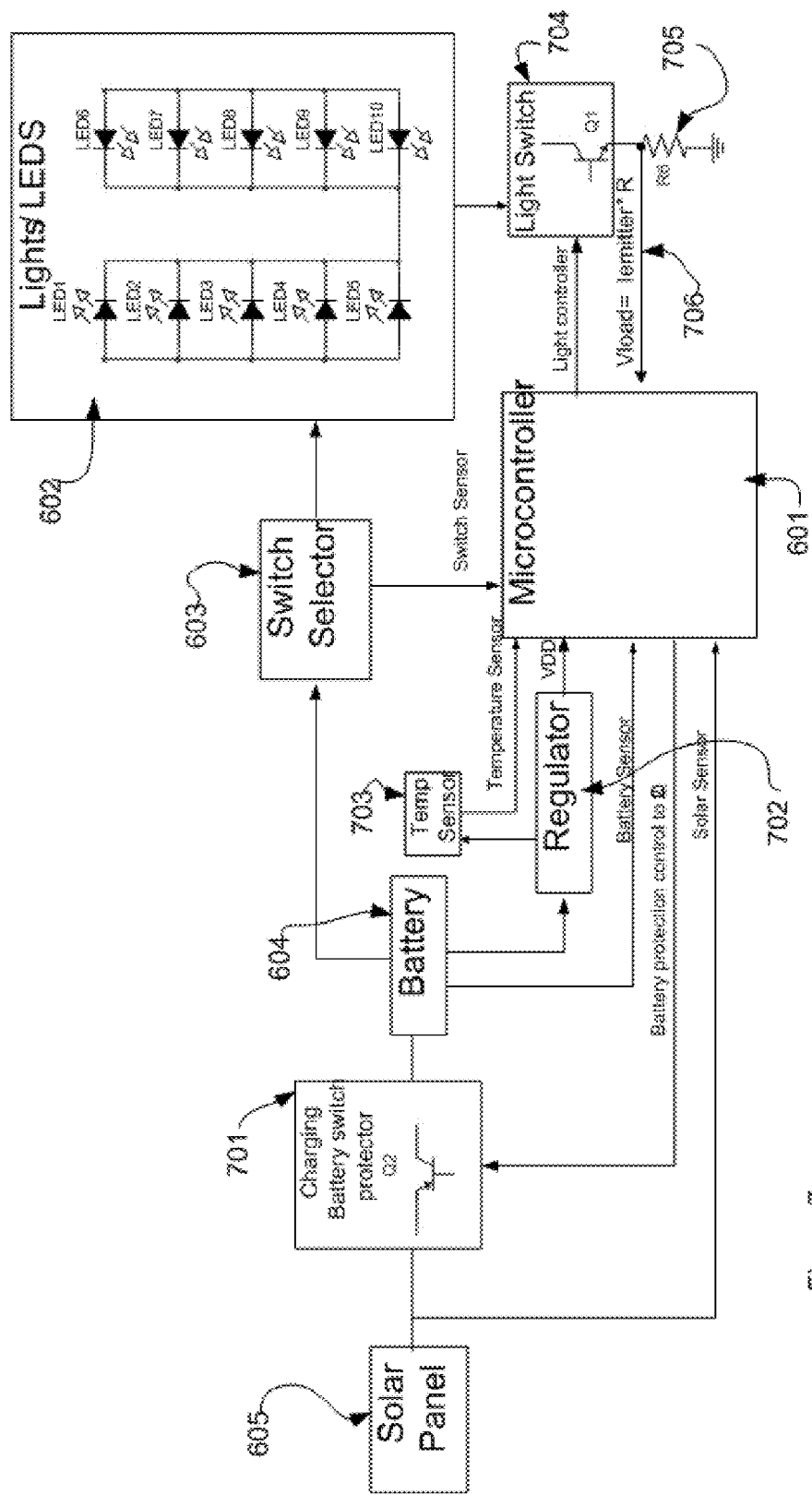
FIG. 7 is a detailed block diagram of the circuitry of FIG. 6.

In one embodiment the circuit consists of 5 basic parts as depicted in FIG. 6. A microcontroller 601 is the focal point of connections to a photovoltaic solar panel 605 as source for recharging batteries 604 and therefore supplying energy to lights 602. An input means 603 allows the user to turn the system on and off and select lighting options. FIG. 7 depicts a more detailed block diagram of the circuits. A microcontroller 601, such as the PIC12F683 from Microchip Technology, Inc. of Chandler, Ariz. forms the heart of the system. The battery 604 provides to the microcontroller through regulator 702 which stabilizes the power supply voltage level over changes in battery voltage caused by charging and discharging. In another embodiment the regulator 702 also supplies regulated power to a temperature sensor 703 that is physically near the battery 604 to sense battery temperature and avoid overheating of the battery. Input to the microcontroller 601 is through integrated input ports and analog to digital converters. Inputs include voltage sense and measurement of the output of the photovoltaic solar panel 605, the output voltage of the battery 604, the output voltage of a temperature sensor and the settings of the input switch 603. Output from the microcontroller is through the GPIO ports and connect to the battery charging control transistor 701 and the light control transistor 704. In one embodiment the input means 603 is a simple mechanically operated electrical switch that allows selection of lighting and other program options. In another embodiment input means 603 is an electronically or optically operated electrical switch, such as used in remote controls.

In another embodiment more accurate control of the energy supplied to the lights is provided by a control system that also includes a resistor 705 and line 706 connected to the microcontroller to read the voltage drop over the resistor and thereby measure the current through the lights. The microprocessor can therefore control this current within preset limits. Real time current feedback is thus provided.

Figure 8:
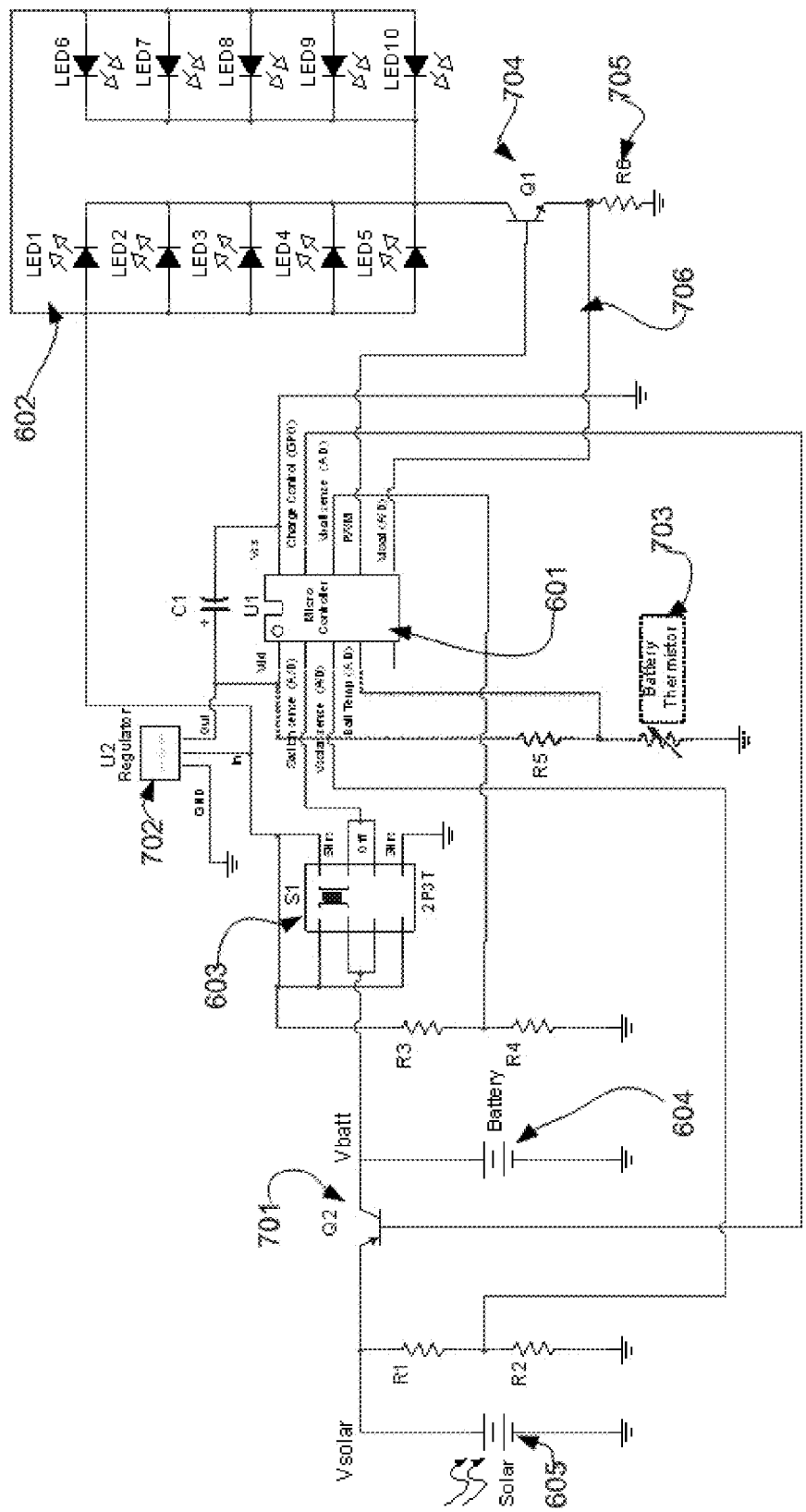
FIG. 8 is a schematic diagram of the circuitry of FIG. 7.

FIG. 8 depicts the detailed schematics of one embodiment of the invention. The main components for this apparatus are the Photovoltaic solar Panel 605, LEDs (Lights) 602, Battery 604, transistor switch to turn on/off the light (Q1) 704, the microcontroller 601, the on and off and user interface switch (S1) 603, the battery charging control transistor switch (Q2) 701 and in some embodiments a temperature sensing circuit (Battery thermistor) 703. Regulator 702 is used to stabilize the operating voltage of the microcontroller and to provide a reference voltage for the analog-to-digital convertor internal to the microcontroller and for the thermistor. In another embodiment the regulator is internal to the microcontroller. In another embodiment the thermistor and switches such as Q1 and Q2 are internal to the microcontroller. The various resistors R1, R2, R3, R4, R5 are used to form voltage measurement ports that scale the voltage of the photovoltaic solar panel, battery or thermistor to fit the dynamic range of the analog to digital converters of the microcontroller. These inputs to the microcontroller include Vsolar Sense (A/D), Switch sense (A/D), Vbatt sense (A/D) and Batt Temp (A/D)—the sensor for the battery temperature connected to the thermistor. The control lines that come out from the microcontroller include: the Pulse Width Modulation (PWM) controller pin output which is used to turn ON and OFF the switch Q1 (transistor used as an electrical switch) that turns the lights on or off, the Charge control (GPO, general purpose output) which is used to control the switch (Q2) that transfers the current from the Solar panel to the battery during charging. The charging circuit charges the battery during the day via the PNP transistor Q2. The control circuit controls the charging time, the LED turn on time, and the time the LED's are on. The Dual pole, 3-throw switch (2P3T) provides an off, 3 Hr, and 5 Hr function that lets the consumer choose how long to turn the LED's on after sunset and before sunrise. The switch separates the charging circuit with the control circuit in the "Off" position of the switch. The regulator U2 provides a regulated output with variable input higher that output voltage. The transistor Q1 controls the current of the LED's via Pulse Width Modulation (PWM) at the base to produce a constant current for the LED's. The PIC microcontroller controls the entire circuit. It takes battery voltage measurements, photovoltaic solar cell voltage measurements, regulates the charging current and the LED current, and also determines the time to turn the LED's On at night.

In another embodiment the circuit additionally includes the resistor 705 and line 706 to provide current feedback control as discussed above. An advantage of the system is that only two transistors 701 and 704 are required for control of the lights, thus simplifying the system and reducing the cost compared with prior systems. Although 701 and 704 are illustrated as bipolar transistors, it will be obvious to one skilled in the art that alternative devices such as metal oxide semiconductor (MOS) and junction field-effect transistors (FETs) can be used to effect the same operation.

Control Software

Figure 9:
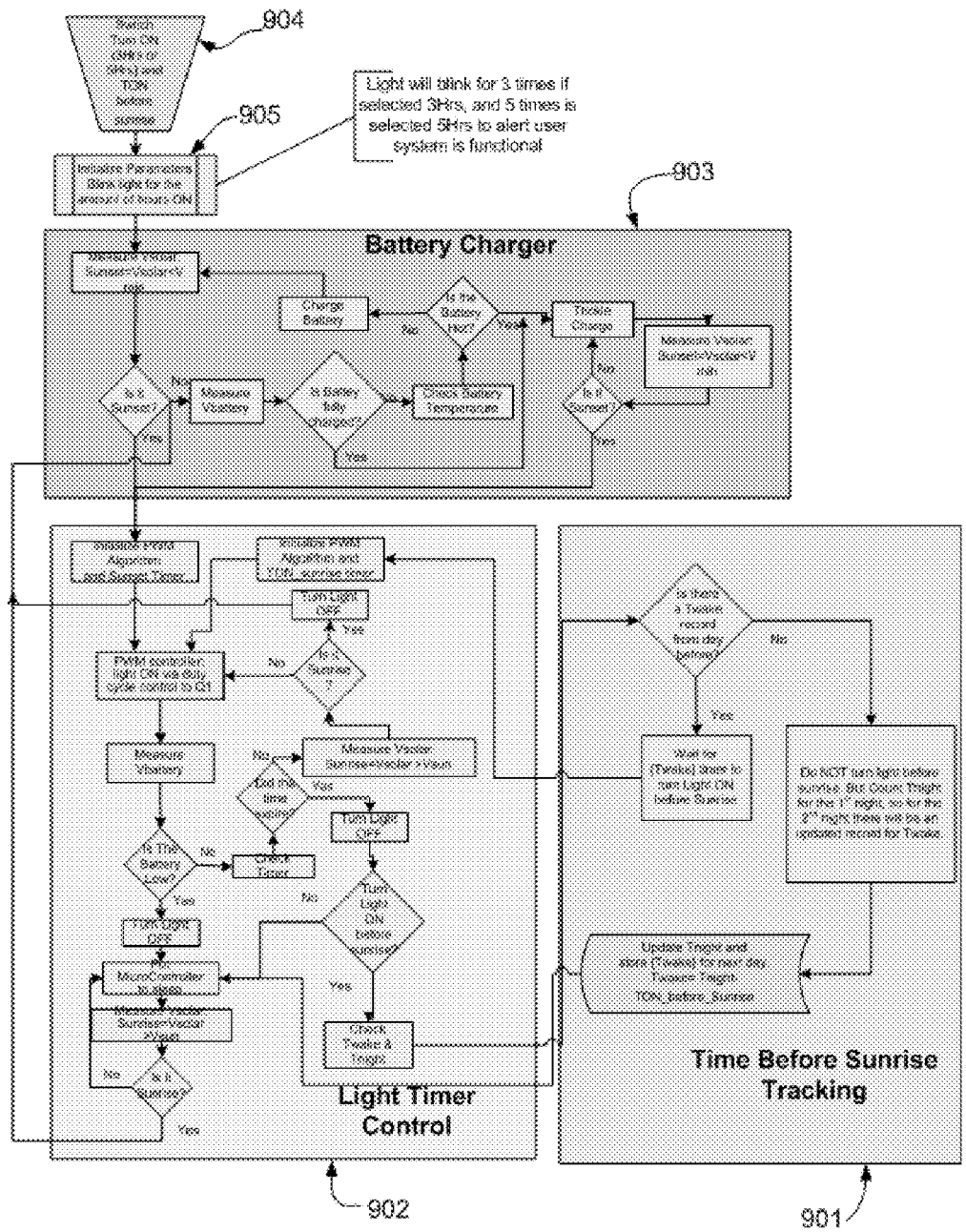
FIG. 9 is a block diagram of the control software of an embodiment of the invention.

FIG. 9 depicts an overview of the software. In a preferred embodiment the software instructions are stored in digital memory internal to the microcontroller 601. In a separate embodiment the instructions are stored in a separate digital memory device, such as flash memory, which is connected to the microcontroller. The system is turned on and the desired program settings are selected 904. In one embodiment the program selection is through a multi-position switch that allows selection of hours after sunset the lights should be turned on and hours before sunrise that the lights should be turned on. At turn on the system is initialized 905. Initialization step includes feedback to the user of the program parameters and initialization of the battery charger algorithms 903. The three main components of the software system are the battery charge algorithms 903, the light timer control algorithm 902 and the time before sunrise tracker algorithm 901. Each are logically interlinked as shown in FIG. 9 and in the detailed views of FIGS. 11, 12 and 16 each of which are as discussed below.

Figure 10:
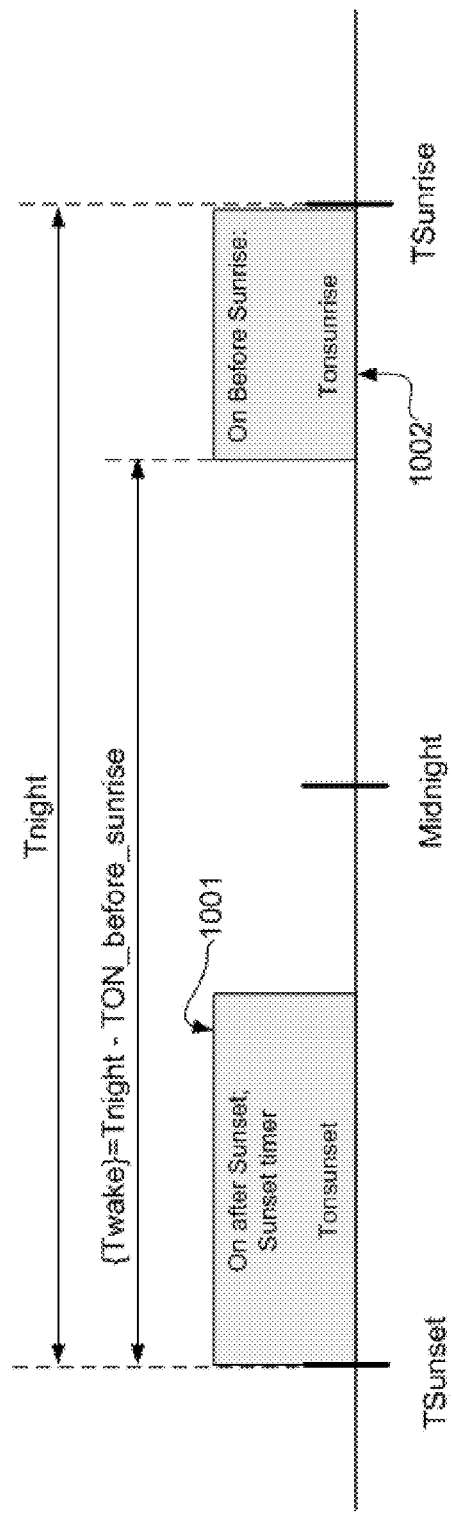
FIG. 10 is a diagram showing the timing definitions of an embodiment of the invention.

Time parameters are depicted in FIG. 10. Time parameters are either a measure of the time of day or a measure of duration. In one embodiment the system defines its own internal time of day clock by sensing sunrise and/or sunset or both based upon voltage measurements of the output of the solar panels. In one embodiment, the time of sunset (Tsunset) is determined when the voltage of the solar panel falls below a trigger level, and the time of the sunrise (Tsunrise) is determined when the voltage level of the solar panel exceeds a trigger level that would indicate the sun is impinging on the solar panels. The difference between Tsunset and Tsunrise is the length of the night Tnight. The duration of the lighting periods are Tonsunset 1001 and Tonsunrise 1002 which are the durations that the lights should be on after sunset and before sunrise respectively. Because of the programming and sensing capabilities there is no need to set or retain the actual time of day in the system memory. The system self-calibrates relative to the occurrence of sunrise and sunset events. This allows for a simplified multi-position switch to be the user interface to program the system for durations of time the lights should be on after sunset and before sunrise.

Figure 11:
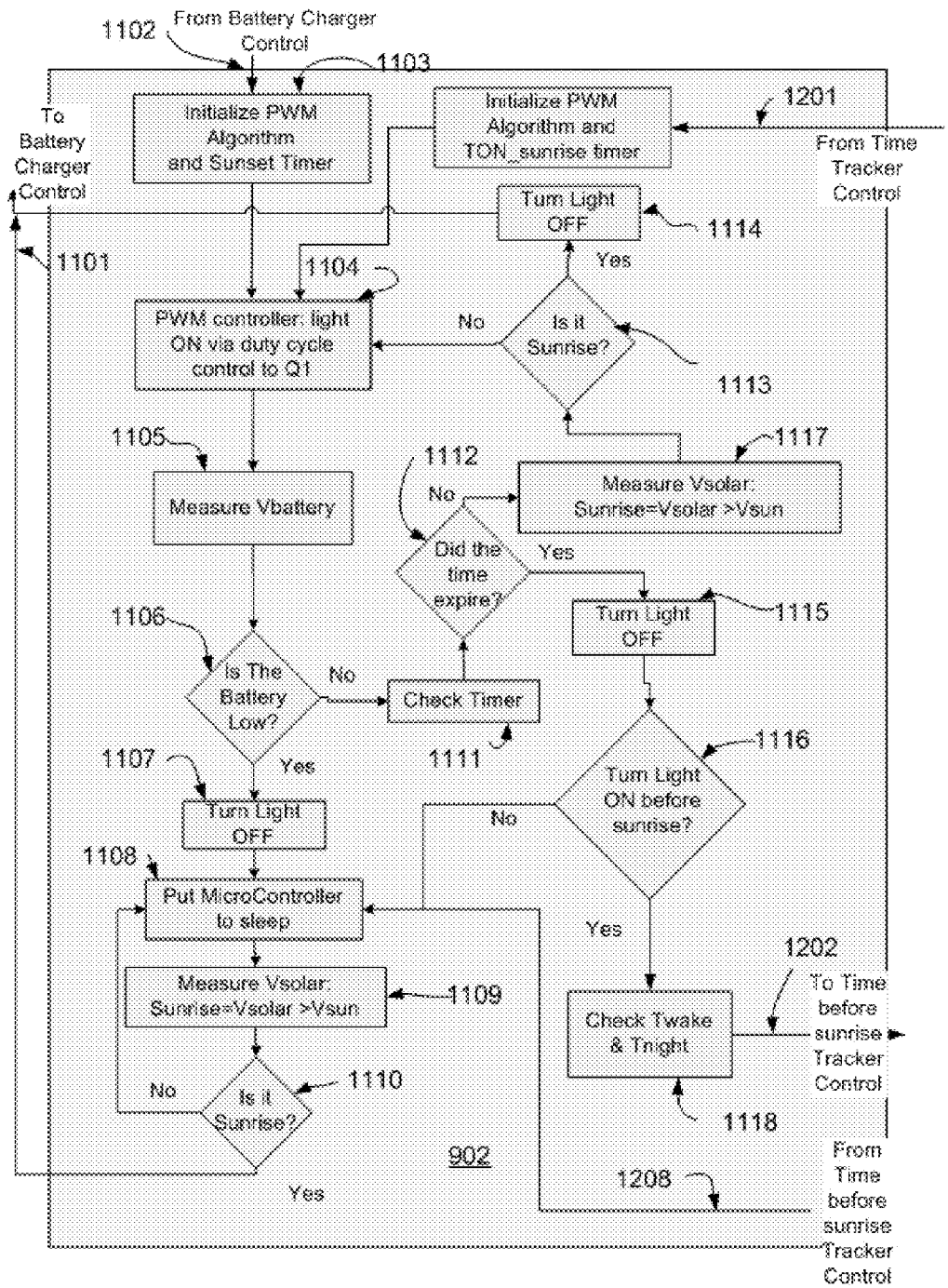
FIG. 11 is a flow diagram of the light timer control software for an embodiment of the invention.

FIG. 11 depicts an exemplary embodiment of the light time control logic flow. Upon initial turn on of the system The battery charge logic, FIG. 16 discussed below, tests 1602 whether the sun has yet set or not based upon the voltage measurement from the solar panels. If it is past sunset a logic signal 1102 is sent to the light time control of FIG. 11 to control the lights. The initialization step 1103 sets the program parameters from the user interface settings in the logic memory. The pulse width modulation logic 1104 then sets the appropriate modulation parameters to control the lights. Parameters included in the modulation control are the timing parameters as well as measured voltage of the batteries and in some embodiments the voltage drop of the load thus providing current feedback control for the lights. The details of the pulse width modulation algorithm are discussed below in association with FIGS. 13, 14 and 15. The system then checks the batteries 1105 and determines whether the batteries are sufficiently charged to operate the lights 1106. If the battery levels are too low, the system will turn off the lights 1107 and put the microprocessor to sleep 1108 except for the monitoring of the solar panel voltages 1109 until the sun comes up. Once the system decides 1110 that the sun has risen, a logic signal 1101 is sent to the battery charger program to recharge the batteries. In this way the system protects the batteries from excess discharge. If it is determined 1106 the batteries have sufficient charge to operate the lights, the system will check the timer 1111 and determine 1112 whether the Tonsunset or Tonsunrise times have lapsed. If so the lights are turned off 1115 and the system checks 1116 whether there is a program parameter set to turn the lights on before sunrise. If so the system checks 1118 whether the system has been through a sunset and sunrise cycle such that it has self calibrated the time of day and can determine Twake and Tnight and turn the light on at the selected time. If the program does not call for the light to be turned on before sunrise ("no" path at 1116), the system will go into sleep mode 1108 and wait for sunrise as discussed above for a low battery situation.

Figure 12:
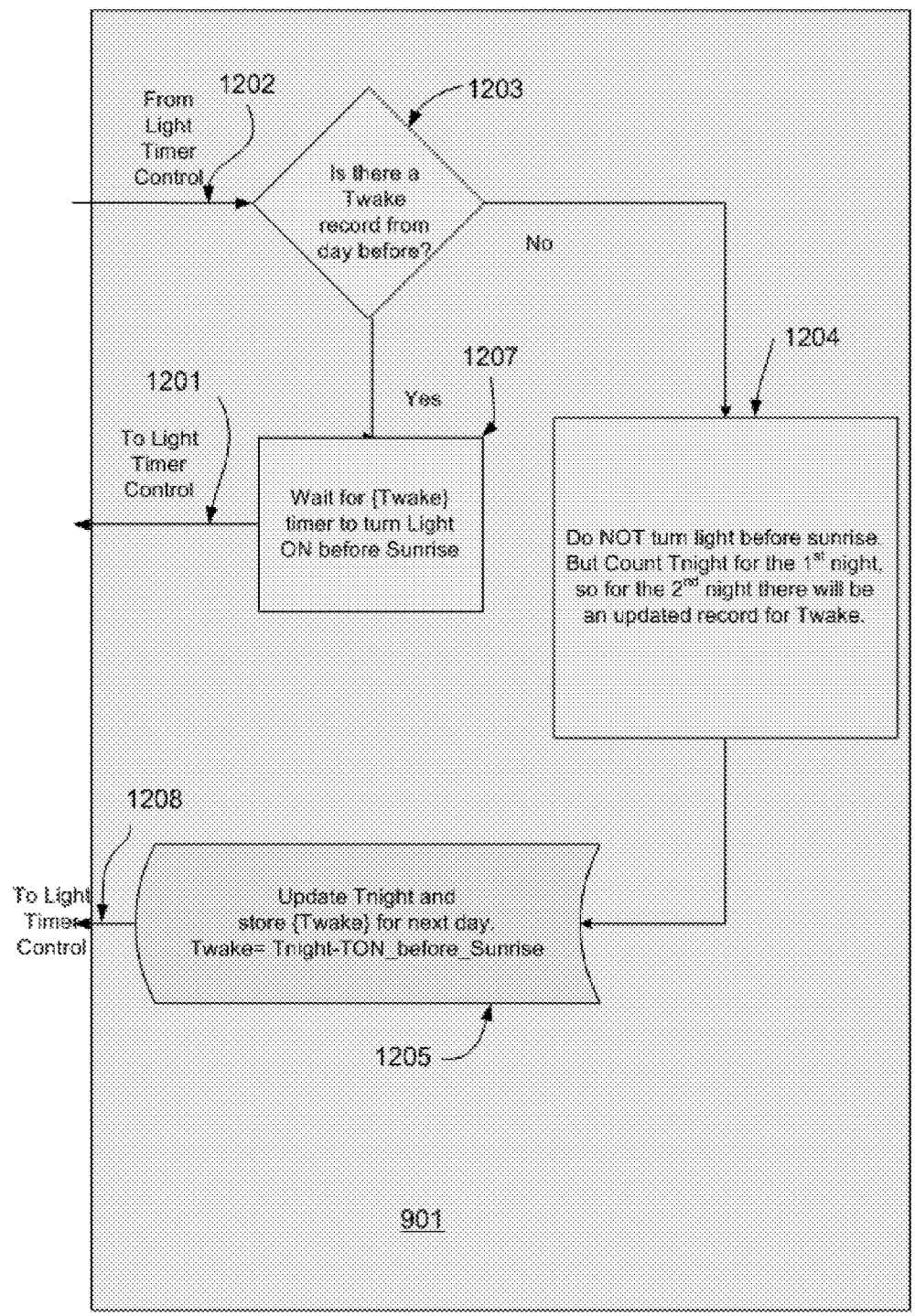
FIG. 12 is a flow chart of the time before sunrise tracking control of an embodiment of the invention.

FIG. 12 depicts an embodiment where there is the ability to turn the lights on before sunrise. If the light timer control logic determines 1116 that there is a parameter set for lighting before sunrise a logic signal 1202 initializes the time before sunrise tracking control of FIG. 12. The system first checks 1203 whether a Twake time parameter has been determined from self calibration by the system having gone through a sunset/sunrise cycle. If not the system does not turn the lights on during the first pre-dawn operation 1204, but rather uses the first night cycle self calibrate and set the time of day parameters 1205. Once set 1205, control passes 1208 to the light timer control and the system is again put into sleep mode to wait for sunrise. If there is a Twake recorded from the day before 1203 the system will wait 1207 until the Twake time has lapsed and then initiate logic 1201 to turn the lights on before sunrise 1119.

Figure 13:
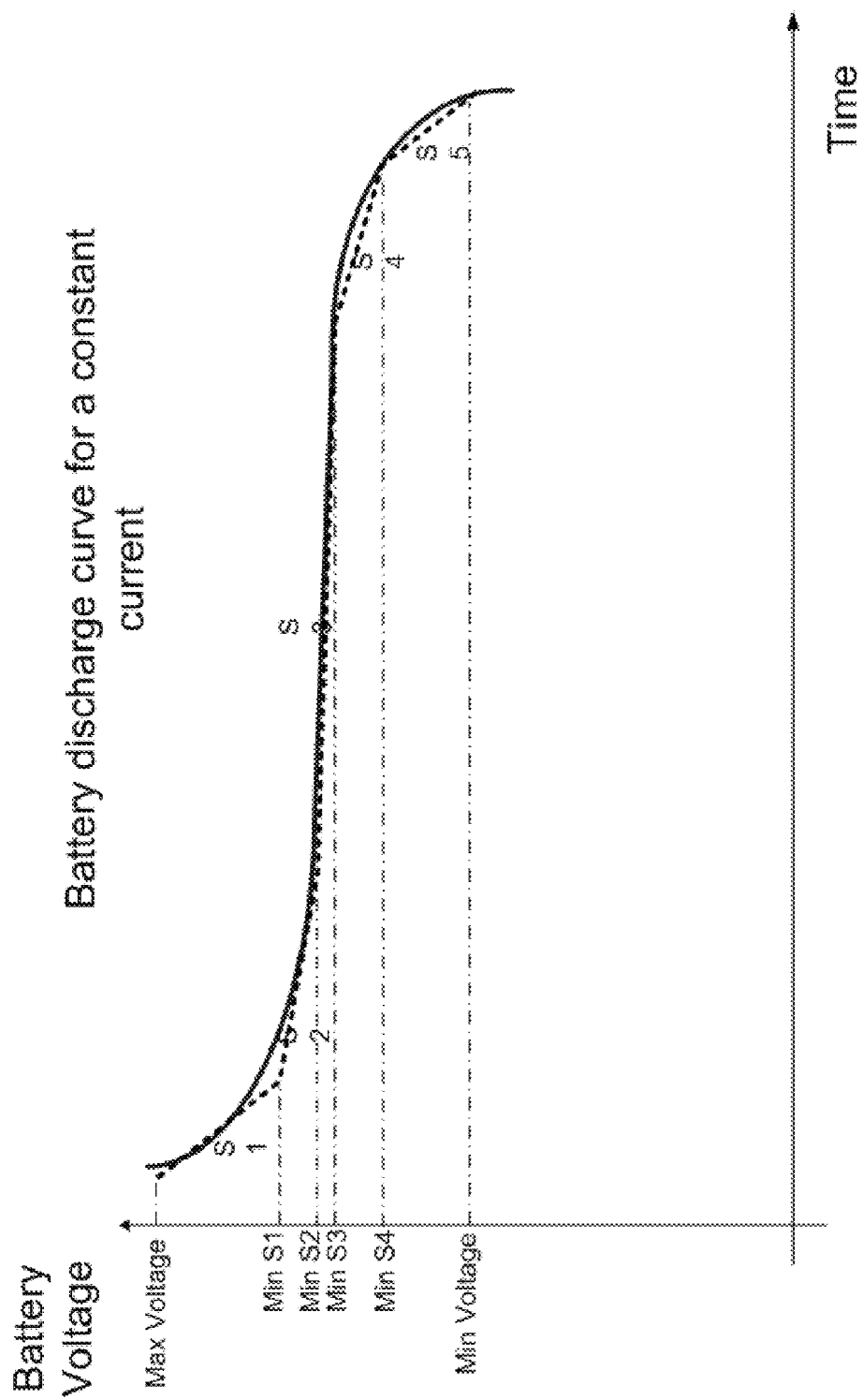
FIG. 13 shows a typical discharge curve for a battery and the approximation to this curve used in an embodiment of the invention.
Figure 14:
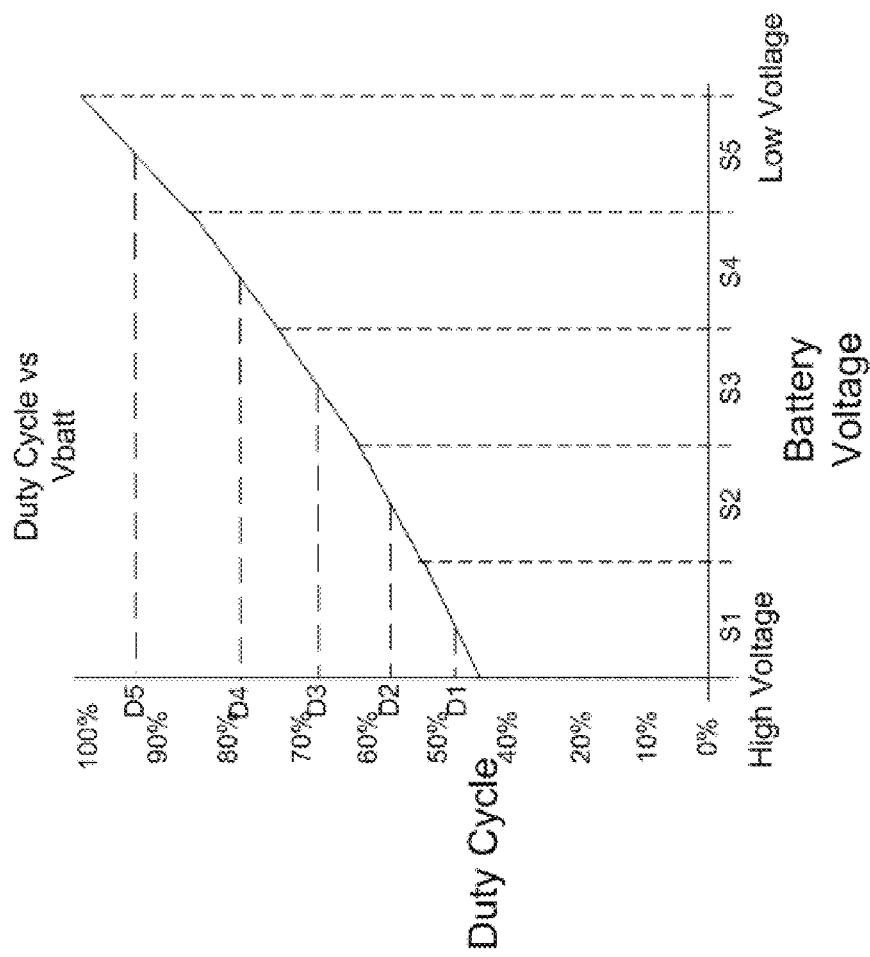
FIG. 14 is a diagram showing the duty cycle selection for an embodiment of the invention.
Figure 15:
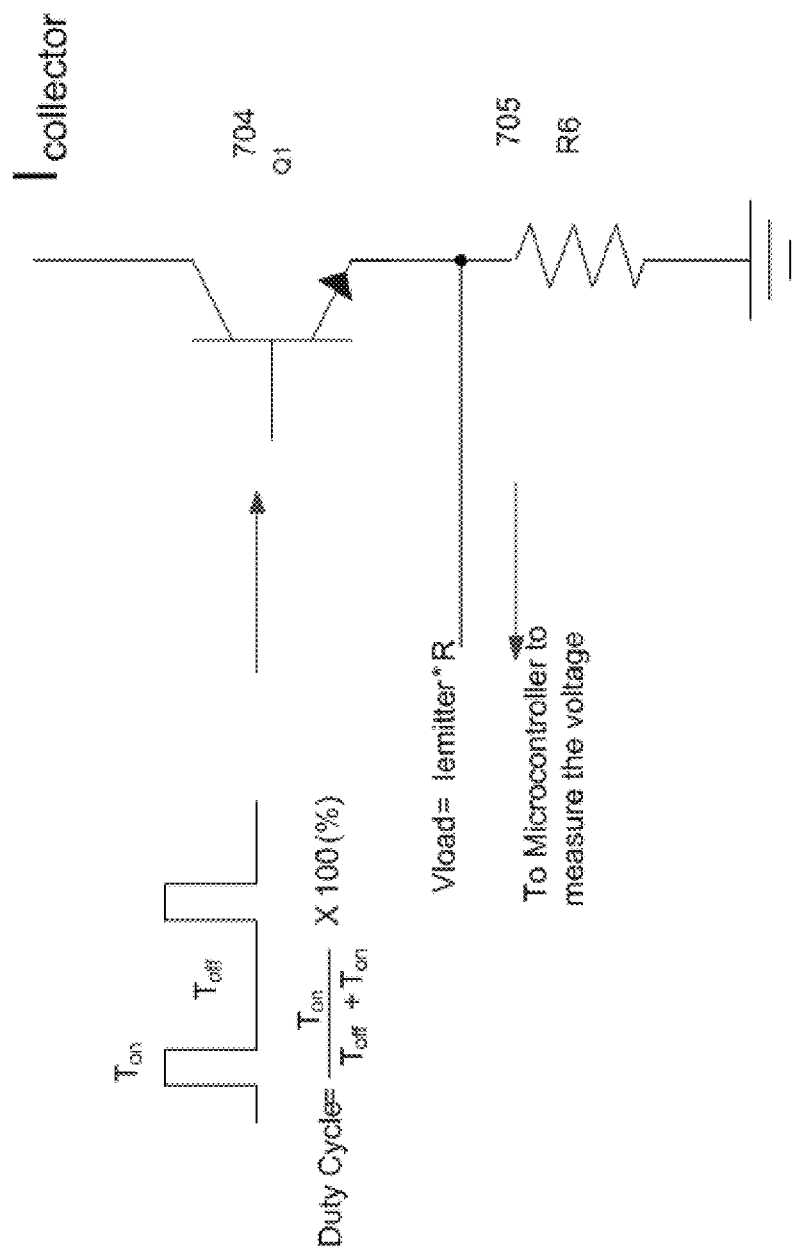
FIG. 15 is a diagram showing the definition of duty cycle as used in an embodiment of the invention.

FIGS. 13, 14 and 15 depict the parameters associated with the pulse width modulation algorithm 1104. FIG. 13 shows a typical discharge curve for a battery used in an embodiment of the invention. Such curves are available from the manufacturers of the batteries. The PWM algorithm approximates the discharge curve by a series of linear segments. In the example of FIG. 13 there are 5 segments shown, S1 through S5. The number of segments chosen is dependent upon the complexity of the discharge curve and the accuracy required for optimum operation of the lights and battery life. The minimum voltages of each linear segment, depicted as Min S1, Min S2, etc. allows the system to determine the current state of discharge of the battery by a measure the battery voltage. Once the current state of the battery is determined, a duty cycle Di, corresponding to Si, is selected from a chart such as depicted in FIG. 14. Although depicted as continuous curves one familiar with the art will realize the curves and selection of parameters Si and Di can be done through lookup tables encoded into the system memory. The system is therefore also seen to be independent of the type of batteries used. Each battery type would behave according to its own discharge curve, which may be encoded into the system to allow selection of the appropriate duty cycle Di as a function of the output voltage of the particular battery system. In another embodiment the battery type is selectable from a number of pre-stored discharge and duty cycle curves. FIG. 15 depicts an example of how the duty cycle is implemented in the system. The PWM modulation will operate on a cycle frequency characterized by the total of Ton and Toff. Ton, and therefore logically Toff, is calculated based upon the duty cycle, Di, selected for the current state of the battery. The microprocessor 601 is programmed to output pulses characterized by the calculated duty cycle. The peak voltage seen by the lights will be the battery voltage less the voltage drop across resistor R6. Therefore the lighting control can be customized for the particular lighting and microprocessor output current by selection of Q1 with sufficient current gain to provide the current necessary to operate the lights.

Figure 16:
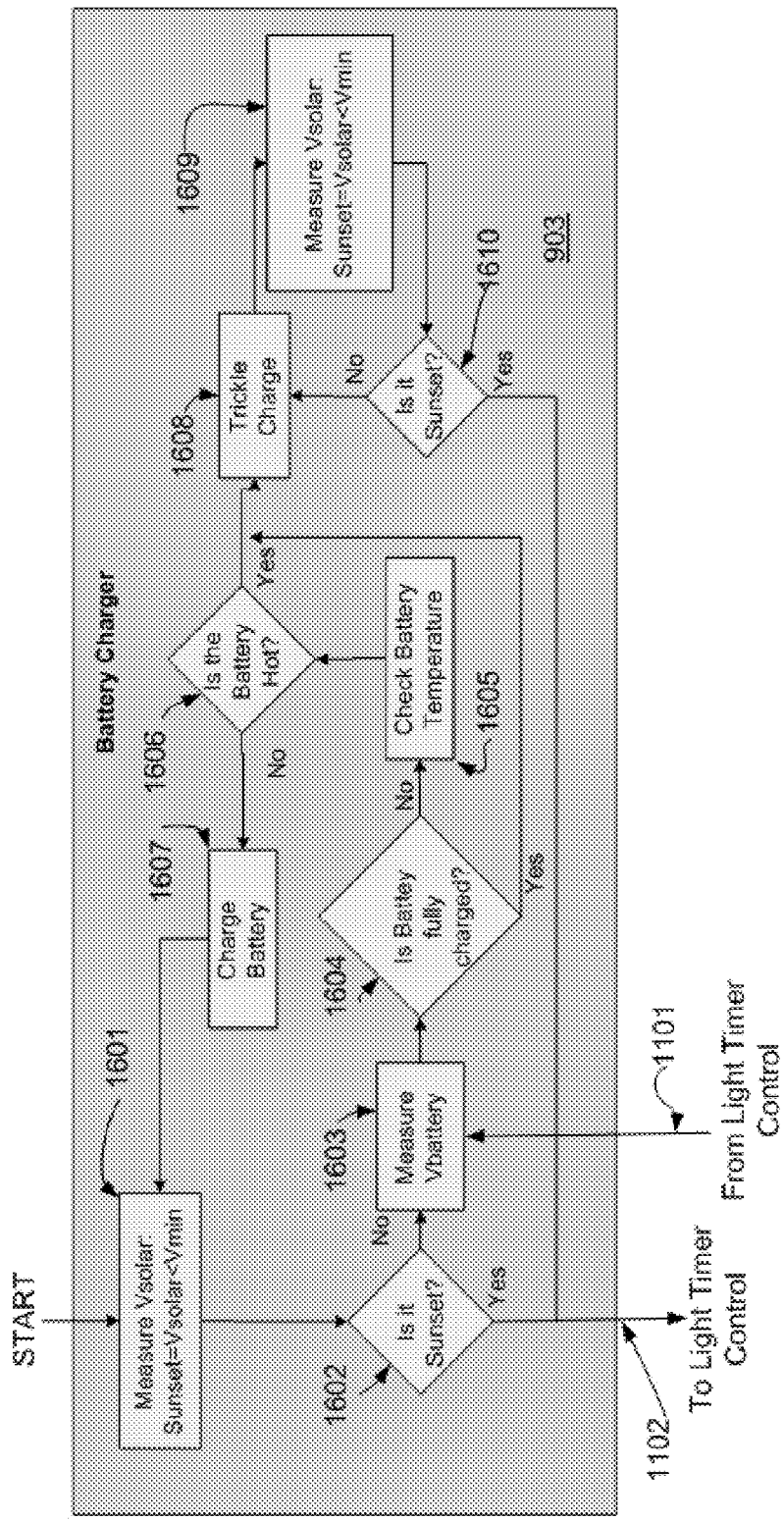
FIG. 16 is a flow chart for the battery charger control software for an embodiment of the invention.

FIG. 16 depicts the logic for the battery charger control in an embodiment of the invention. Upon initiation the system first measures the solar panel voltage 1601 to determine whether the sun has set 1602. If not the system measure the battery voltage 1603 and determines 1604 whether the battery is fully charged based upon the discharge curves discussed above. If the battery is not fully charged, the system then checks the battery temperature 1605 and determines 1606 whether the battery is too hot to accept a full charge. If the battery is too hot, the system will trickle charge the battery 1608 while it waits for sunset 1609 and 1610. The system will also just trickle charge the battery 1608 if it determines 1604 that the battery is fully charged. If the battery is not fully charged and is not too hot to accept a full power charge, the system will allow full power to charge the battery through the logic of 1606 and 1607 while it awaits sunset 1601, 1602.

Figure 17:
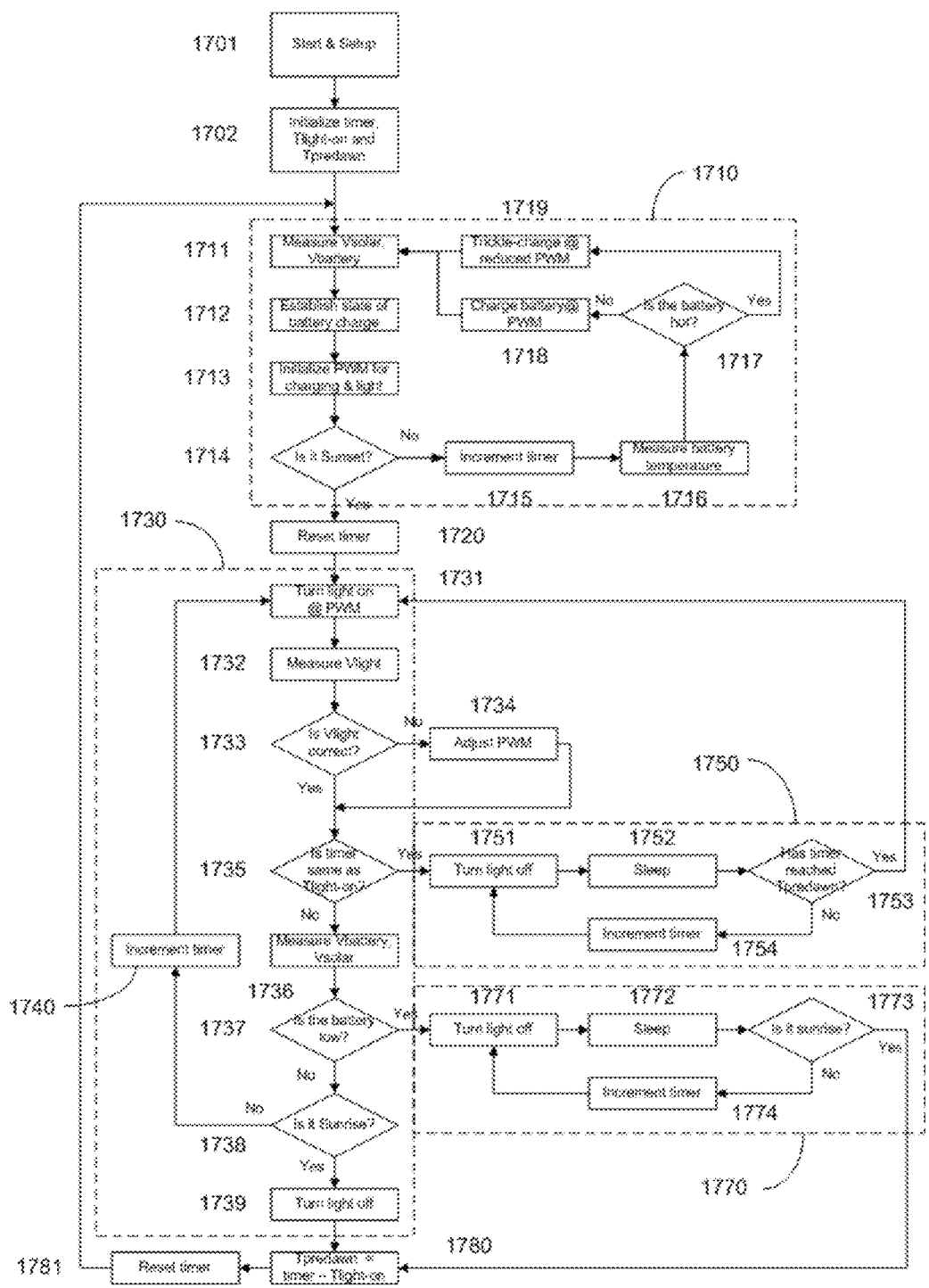
FIG. 17 is a flow chart for an alternative embodiment of the invention.
Figure 18:
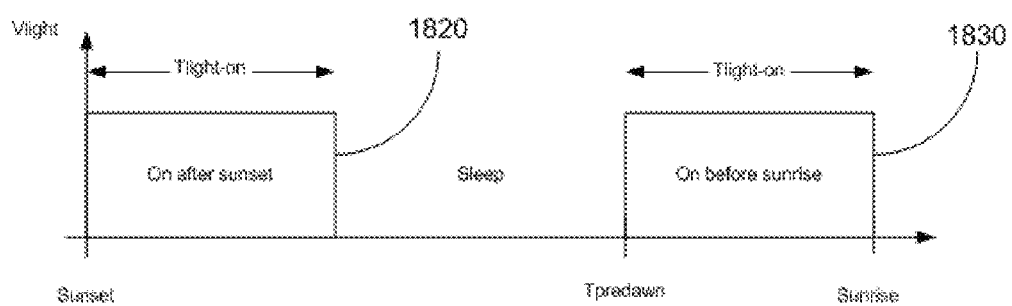
FIG. 18 is a diagram showing the timing definitions for the embodiment of FIG. 17.

FIG. 17 shows a flow chart for an alternative embodiment of the controller software. This embodiment employs two primary timing loops: a daylight timing loop 1710 that terminates upon sensing of a sunset event 1714, and a nighttime loop 1730 that terminates upon sensing of a sunrise event 1738. Nighttime loop 1730 also feed two sleep loops, 1750 and 1770. Sleep loop 1750 terminates when the active timer reaches a count that is associated with the start of the predawn illumination period, while sleep loop 1770 terminates upon sensing of a sunrise event 1773. FIG. 18 shows the timeline for the nighttime loop which illustrates the definitions of the timing parameters for this embodiment. The lights are activated for the same duration (Tlight-on) after sunset 1820 and preceding sunrise 1830 with an intervening sleep period. During the daytime period extending from sunrise to sunset the lights are off and the battery is charged by the solar panel.

Upon starting the system and completing the setup 1701 tasks described in the text for FIG. 9 including the establishment of the number of timer cycle counts in a light-on period, the system timer is initialized, as is a default value for the number of timer cycle counts associated with the predawn lighting period 1702. Upon entering daylight loop 1710 the A/D convertor is utilized to digitize the voltage levels of the battery and the solar panel 1711. The charge state of the battery is established 1712 from the battery voltage measurement as described previously and is used to initialize the PWM duty cycle parameters 1713 for charging the battery and powering the light. The solar panel voltage measurement is then used to establish whether a sunset event has occurred 1714. This determination is important to the reliable operation of the system, and it may involve several decision levels, as will be described subsequently. If sunset has not occurred, the timer cycle count is incremented 1715 and the A/D convertor is optionally employed to measure the battery temperature 1716. If the battery temperature is within normal operating limits 1717, battery charging proceeds 1718 for a predefined period at the PWM duty cycle setting determined earlier in the loop, and the loop closes at measurement step 1711. If the battery temperature exceeds a predetermined limit 1717, then battery charging proceeds at a reduced PWM duty cycle in a "trickle charge" mode 1719 and the loop closes at 1711. The charging period is selected to establish an overall loop period ranging from a fraction of a second to several tens of seconds. If a sunset event is detected, then control passes out of daylight loop 1710 to nighttime loop 1730 in a step 1720 that includes resetting the timer so that subsequent accumulated counts reflect the number of cycle counts that have occurred since sunset.

Upon entering the nighttime loop 1730, power is applied from the battery to the light at the PWM duty cycle established earlier. A voltage level, Vlight, directly related to the light current is digitized 1732 in the A/D convertor and is used to adjust the PWM duty cycle 1733, 1734 to obtain a predetermined average current flow in the light. The accumulated timer count is then compared to the predetermined value associated with the light-on period 1735, and if found to be within a small window of the desired count, control is passed to sleep loop 1750 wherein the light is extinguished. Otherwise, control proceeds to effect a measurement of Vbattery and Vsolar 1736. Vbattery is checked relative to a predetermined threshold in 1737, and if the battery is found to be sufficiently discharged control is passed to sleep loop 1770. If the battery is found to be adequately charged, control passes to a determination as to whether sunrise has occurred 1738. As for sunset determination, sunrise determination is important to the reliable operation of the system, and it may involve several decision levels, as will be described subsequently. If sunrise is detected, the light is turned off and control exits nighttime loop 1730. If sunrise is not detected, then the timer is incremented and control passes back to the top of the loop. The nighttime lighting period 1731 is selected to establish an overall loop period equal to that used in the daylight loop 1710. If sunrise is detected, then the timer count, less the light-on value, is stored as the updated predawn cycle count 1780, the timer is reset 1781 and control passes back to the top of the daylight loop at 1711. In another embodiment, the new timer count is stored in memory and combined with a plurality of previous counts to establish a rolling average value that can be used to develop a predawn period count having less variability than when calculated using the instantaneous value.

When the timer count reaches the light-on count value in 1735, control passes to the sleep loop 1750 wherein the light is extinguished 1751 and control loops through a sleep period 1752 while the timer continues to be incremented 1754 until the timer count reaches the value established for initiation of the predawn illumination interval 1753. When this count is reached, control passes to the top of loop 1730 where power is again applied to the light. The period of sleep loop 1750 is adjusted to be equal to the period of the daylight loop 1710. The predawn illumination period is terminated upon detection of sunrise 1738.

If the battery voltage is determined to be too low in 1737, then control passes to sleep loop 1770 which is identical in most respects to sleep loop 1750, except that it is terminated only by the detection of a sunrise event 1773. When this occurs, control is passed out of the loop to the predawn period update 1780.

Figure 19:
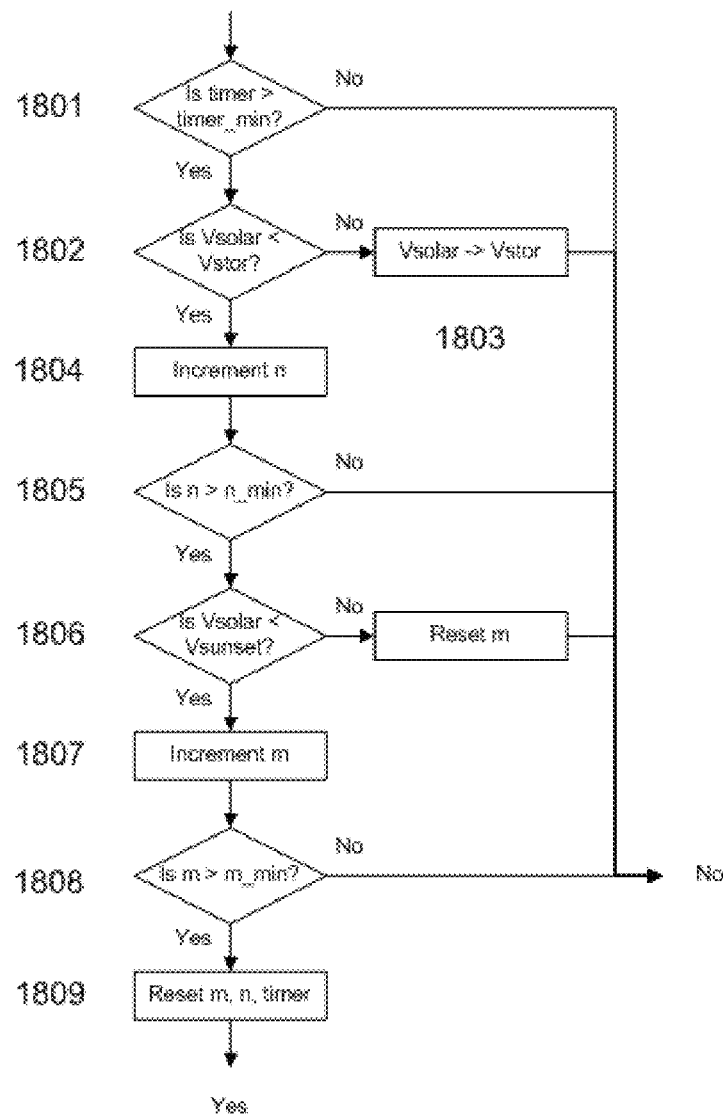
FIG. 19 is an expanded flow chart of the "Is it sunset" block in FIG. 17.
Figure 20:
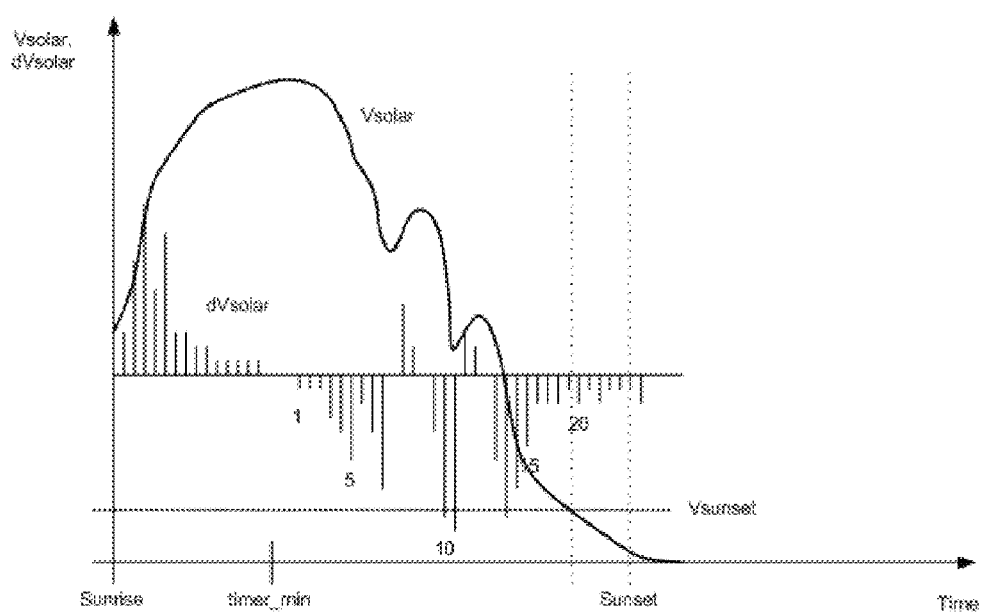
FIG. 20 is a diagram that illustrates the operation of the algorithm shown in FIG. 19.

As indicated in the discussion above, the accurate determination of sunrise and sunset events is important to the reliable operation of the invention. FIG. 19 shows an expansion of the FIG. 17 element 1714 wherein sunset is detected using the measured voltage of the solar panel. The figure shows three levels of discrimination, beginning with a requirement of daylight having been present for a minimum period before further discrimination is attempted, as further illustrated in FIG. 20. The daytime loop timer count is compared to a predetermined minimum count, timer_min. Application of higher levels of discrimination are bypassed until the timer count exceeds the minimum 1801. This ensures that it has been daylight for long enough to support a reasonable expectation that sunset will occur in the near future. Once this minimum daylight period requirement is met, the incremental change in Vsolar is examined 1802 by comparing the current value of Vsolar with the previous value stored as the value Vstor 1803. It is required that Vsolar decrease (Vsolar<Vstor) for a separately specified minimum number of cycle counts, n_min 1805, before the final requirement is applied. This is further illustrated in FIG. 20 where the incremental changes in Vsolar, dVsolar, corresponding to decreasing values are consecutively numbered. This ensures that daylight has been decreasing for long enough to support a reasonable expectation that sunset is imminent. Finally, Vsolar must fall below a predetermined threshold value, Vsunset 1806, for a predetermined number of consecutive cycle counts, m_min 1808, before reaching a final determination that sunset has occurred. This is illustrated in FIG. 20, which shows that sunset is declared six cycle counts after Vsolar falls below the threshold value, Vsunset, assuming that m_min is less than 19. This ensures that a sunset event is not declared by a transitory event, such as the passage of a raincloud.

It will be clear to one skilled in the art that the same basic procedure described above for the detection of a sunset event applies equally to the determination of sunrise, for example in FIG. 17 elements 1738 and 1773. In this case the top level discrimination is based on a requirement that darkness exist for a first minimum period, the second discrimination requires Vsolar to increase for a second minimum period, and the final discrimination requires that Vsolar continuously exceed a predetermined threshold for a third minimum period.

Figure 21:
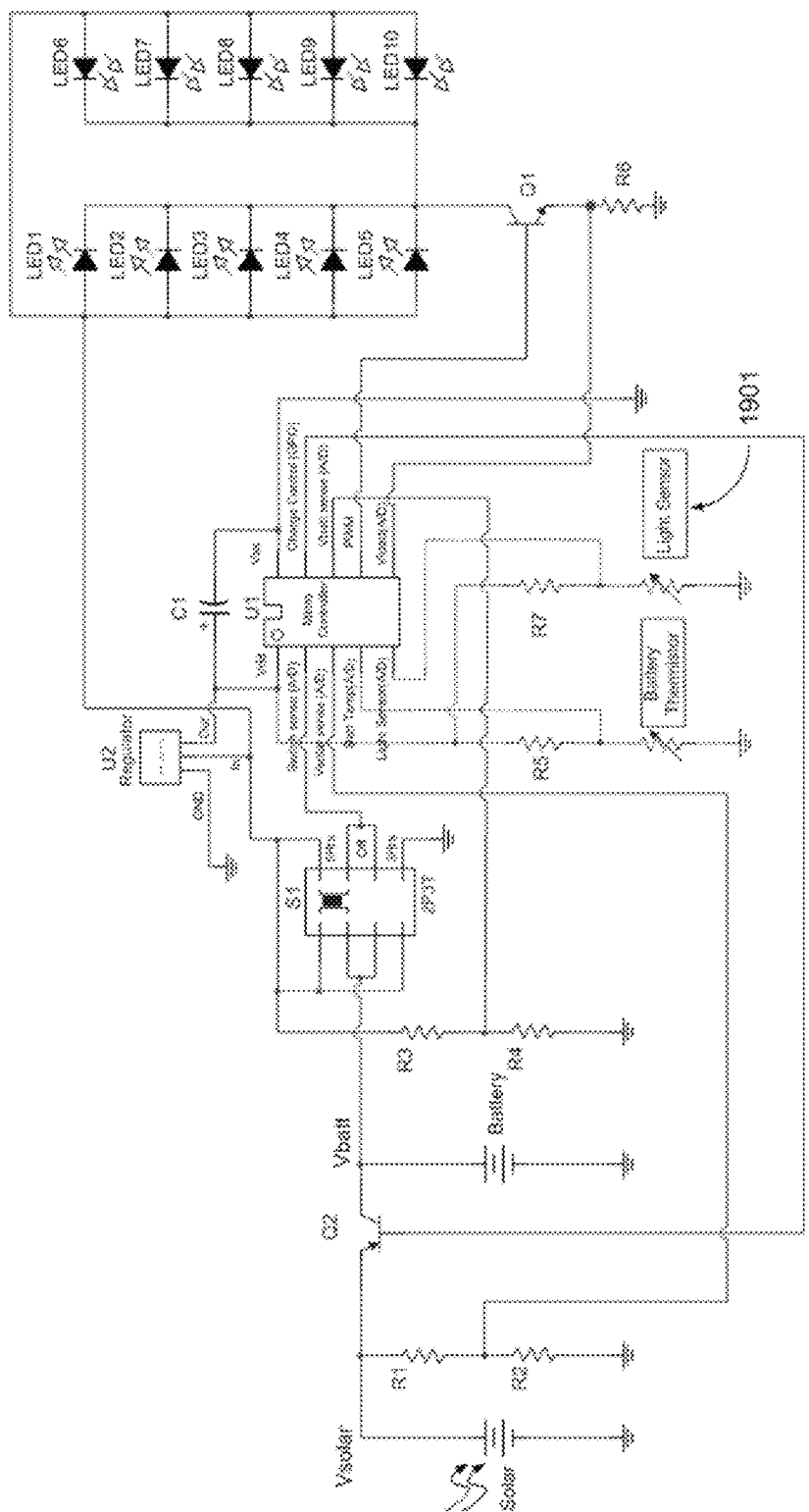
FIG. 21 is a schematic diagram of the circuitry including a separate light sensor.

The described system uses the solar panel both for determination of the time of day and as a power source for the battery system. In an alternative embodiment a separate light sensor can be employed to establish the time of day either by itself or in concert with the solar panel. This approach allows the sensitivity and spectral response of the photocell to be optimized for sunrise and sunset detection tasks separately from similar parameters that affect the efficiency of the solar panel. FIG. 21 shows a modified system schematic diagram similar to FIG. 8 in which a separate light sensor 1901, such as a cadmium sulfide (CdS) photocell, is included to provide electronic input for the sunrise/sunset determination. The photocell is connected to a separate A/D analog input through a fixed bias resistor, R7, which resistance value is selected based on the resistance range of the photocell.

Figure 22:
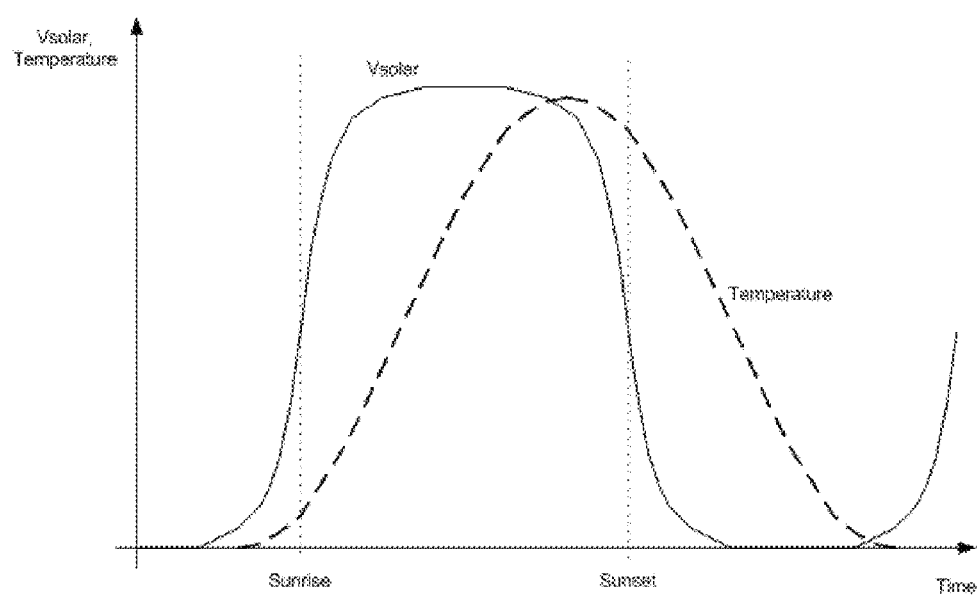
FIG. 22 is a graph that illustrates the relationship between the solar array voltage and the system temperature as functions of time.

Another alternative embodiment uses a temperature sensor to establish the time of day. A nonlimiting example uses the battery temperature sensor 703 shown in FIG. 8. FIG. 22 shows how the solar panel voltage, Vsolar, and the battery temperature can be expected to vary during a one-day period. Whereas Vsolar can be expected to exhibit relatively flat maxima and minima (except for the effects of clouds and other weather, which are not included in the figure) the battery temperature excursions are expected to be largely sinusoidal with maxima and minima skewed towards sunset and sunrise, respectively. Therefore, the daily temperature variation, including the effect of self-heating of the battery caused by charging during daylight hours, can be used to calibrate the length of the daylight and/or night periods.

The described system uses the solar panel both for determination of the time of day and as a power source for the battery system. In another embodiment, not expressly shown, a second source of energy can be used to charge the battery 1607. Nonlimiting exemplary systems include wind power, hydroelectric power, gas or diesel powered generators or even a connection to a conventional electrical outlet when available.

In another embodiment the time of day is maintained through a battery system and the secondary source of power to recharge the batteries may be a wind generator, hydroelectric generator, gas or diesel powered generators or a connection to a conventional electrical outlet.

In another embodiment of the invention not expressly shown, a motion sensor module, such as a passive infrared sensor known in the art, is attached to the system. The output of the motion sensor is monitored by the microcontroller and the software includes instructions that activate the lights during the sleep period between sunset and sunrise if motion is detected, such as from a passing pedestrian. In addition to making the sign readable to nocturnal passers-by, the resulting illumination dissuades potential thieves from tampering with the invention.

CONCLUSIONS

Lighting system hardware and control are described. Advantages of the system include the ability to add lighting to an otherwise unmodified location by providing a clamping system that is adaptable to multiple configurations and remote operability. Remote operability includes the ability to use renewable power sources such as solar or wind power and the ability for self-calibration with respect to the time of day. The system also minimizes the number of circuit components required thus making it optimally inexpensive and reliable.

A number of embodiments of the invention have been described. It will be understood that various modifications may be made without departing from the spirit and scope of the invention.

I claim:

1. A control system for a lighting system that uses a photovoltaic solar panel to provide electrical current to charge a rechargeable battery which provides electrical current to electronic lighting devices comprising:
   a) a microcontroller including digital memory for storage of software instructions, one clock circuit, four analog inputs switchably connected to at least one analog-to-digital (A/D) convertor and/or permanently connected to at most four A/D convertors, and at least one digital output,
   b) a reference voltage source,
   c) a means for providing user-selectable operating options,
   d) an electronic measurement port connecting the photovoltaic solar panel to the first of said four analog inputs,
   e) an electronic measurement port connecting the rechargeable battery to the second of said four analog inputs,
   f) an electronic measurement port connecting the means for providing said user selectable operating options to the third of said four analog inputs,
   g) a means for measuring the electrical current supplied to the electronic lighting devices,
   h) an electronic measurement port connecting the measured electronic lighting device current to the fourth of said four analog inputs,
   i) a first electronic switch operated by said microcontroller digital output that controls the flow of electrical current to the lighting devices,
   j) a second electronic switch that controls the flow of electrical current from the photovoltaic solar panel to the rechargeable battery,
   k) software stored in said memory, said software includes instructions so that the microcontroller controls the first electronic switch based on voltages measured at said first, second, third and fourth analog inputs.

2. The control system of claim 1 further comprising software instructions for storing counts derived from said clock circuit corresponding to the duration of the period from sunset to sunrise based on the voltage measured at said first analog input, and enabling operation of said first electronic switch to provide illumination during a sunset illumination period after sunset and a sunrise illumination period prior to sunrise.

3. The control system of claim 1 wherein the second electronic switch is operated by a second digital output on the microcontroller and the software further includes instructions so that the microcontroller controls the second electronic switch based on voltages measured at said first and second analog inputs.

4. The controller system of claim 1 wherein said means for providing user-selectable operating options comprises an electrical switch operated by mechanical, optical or electronic means.

5. The control system of claim 1 further comprising software instructions to enable the use of pulse width modulation using said first electronic switch to adjust the average intensity of the lighting devices during periods of illumination based on voltage measured at said second analog input.

6. The control system of claim 1 further comprising an electronic means for measuring the temperature of the rechargeable battery connected to an additional, fifth, analog-to-digital convertor input on the microcontroller and the software further includes instructions so that the microcontroller controls the second electronic switch based on voltages measured at said first, second, and fifth analog inputs whereby the charging current from the photovoltaic solar panel is adjusted if the battery temperature exceeds a threshold value.

7. The control system of claim 1 further comprising a separate electronic means for measuring the light incident on the system connected to an additional, fifth, analog-to-digital convertor input on the microcontroller and the software further includes instructions to derive counts of said clock circuit corresponding to the duration of the period from sunset to sunrise based on the output of the fifth analog-to-digital convertor.

8. The control system of claim 1 further comprising separate electronic means for sensing motion in the immediate vicinity of the system, said means operably connected to the microcontroller and the software further includes instructions for enabling operation of said first electronic switch to provide illumination when motion is sensed.

9. A method of operating a microcontroller-based control system for a lighting system that uses a photovoltaic solar panel to provide electrical current to charge a rechargeable battery which provides electrical current to electronic lighting devices comprising:
   a) Establishing a system time using a clock circuit built into the microcontroller,
   b) Monitoring the output voltage of the photovoltaic solar panel to establish the occurrence of sunrise and sunset,
   c) Controlling "on"-times and "off"-times of the lighting devices based on user-selected options to pre-established time intervals,
   d) Monitoring the output voltage of the rechargeable battery to establish its state of charge,
   e) Monitoring the electrical current supplied to the electronic lighting devices,
   f) Applying the output of the photovoltaic solar panel to charge the battery if the photovoltaic solar panel has adequate output voltage and the established state of charge of the battery shows it to be at least partially discharged,
   g) Adjusting the electronic lighting device current to control power consumption and illumination intensity of the electronic lighting devices during intervals of operation based on the established charge state of the battery,
   h) Adjusting the current supplied by the photovoltaic solar panel to the rechargeable battery based on a measurement of the temperature of the battery.

10. A method of operating a microcontroller-based control system for a lighting system that uses a photovoltaic solar panel to provide electrical current to charge a rechargeable battery which provides electrical current to electronic lighting devices comprising:

a) Establishing a system time using a clock circuit built into the microcontroller, b) Monitoring the output voltage of the photovoltaic solar panel to establish the occurrence of sunrise and sunset, c) Controlling "on"-times and "off"-times of the lighting devices based on user-selected options to pre-established time intervals, d) Monitoring the output voltage of the rechargeable battery to establish its state of charge, e) Monitoring the electrical current supplied to the electronic lighting devices, f) Applying the output of the photovoltaic solar panel to charge the battery if the photovoltaic solar panel has adequate output voltage and the established state of charge of the battery shows it to be at least partially discharged, g) Adjusting the electronic lighting device current to control power consumption and illumination intensity of the electronic lighting devices during intervals of operation based on the established charge state of the battery, h) Monitoring the output voltage of a temperature sensor to establish the occurrence of sunrise and sunset wherein the temperature sensor is also used to measure battery temperature.

11. A control system for a lighting system that uses a photovoltaic solar panel to provide electrical current to charge a rechargeable battery which provides electrical current to electronic lighting devices comprising:

a) a microcontroller including digital memory for storage of software instructions, one clock circuit, at least four analog inputs switchably connected to at least one analog-to-digital (A/D) convertor, and at least one digital output, b) a reference voltage source, c) a means for providing user-selectable operating options, d) a first electronic switch operated by said microcontroller digital output that controls the flow of electrical current to the lighting devices, e) a second electronic switch that controls the flow of electrical current from the photovoltaic solar panel to the rechargeable battery, f) software stored in said memory, said software includes instructions so that the microcontroller controls the first electronic switch based on voltages measured at said analog inputs.

* * * * *